United States Patent
Deshpande et al.

(10) Patent No.: US 10,354,282 B2
(45) Date of Patent: Jul. 16, 2019

(54) COMMUNICATING WITH A CUSTOMER TRAVELING ON A ROUTE TO A LOCATION

(71) Applicant: INTERNATIONAL BUSINESS MACHINES CORPORATION, Armonk, NY (US)

(72) Inventors: Ajay A. Deshpande, White Plains, NY (US); Kimberly D. Hendrix, New Albany, OH (US); Herbert S. McFaddin, Yorktown Heights, NY (US); Chandra Narayanaswami, Wilton, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 232 days.

(21) Appl. No.: 14/742,763

(22) Filed: Jun. 18, 2015

(65) Prior Publication Data

US 2016/0012488 A1 Jan. 14, 2016

Related U.S. Application Data

(63) Continuation of application No. 14/529,925, filed on Oct. 31, 2014.

(60) Provisional application No. 61/897,888, filed on Oct. 31, 2013.

(51) Int. Cl.
*G06Q 30/02* (2012.01)

(52) U.S. Cl.
CPC ..... *G06Q 30/0267* (2013.01); *G06Q 30/0255* (2013.01)

(58) Field of Classification Search
CPC ....................................... G06Q 30/02
See application file for complete search history.

(56) References Cited

U.S. PATENT DOCUMENTS

| 6,249,772 B1 * | 6/2001 | Walker | G06Q 20/00 |
| | | | 705/26.41 |
| 7,027,999 B2 * | 4/2006 | Smith | G06Q 10/06375 |
| | | | 705/7.31 |

(Continued)

OTHER PUBLICATIONS

List of IBM Patents or Patent Applications Treated As Related—filed Jul. 30, 2015; 2 page.

(Continued)

*Primary Examiner* — Vincent M Cao
(74) *Attorney, Agent, or Firm* — Cantor Colburn LLP; Grant Johnson

(57) ABSTRACT

Embodiments are directed to a computer implemented method of selecting a partner marketing communication. The method includes receiving, by a processor circuit, data of a potential visit by a customer to a location. The method further includes making a determination, by the processor, based at least in part on the data of the potential visit by the customer to the location, that the customer or an agent of the customer may travel to the location. The method further includes selecting, by the processor circuit, at least one partner marketing communication from among a plurality of available partner marketing communications based at least in part on the data of the potential visit and the determination that the customer or the agent may travel to the location.

17 Claims, 8 Drawing Sheets

(56) References Cited

U.S. PATENT DOCUMENTS

| | | | | |
|---|---|---|---|---|
| 2004/0220854 | A1* | 11/2004 | Postrel | G06Q 30/02 705/14.35 |
| 2008/0243780 | A1* | 10/2008 | Nance | G06F 17/30699 |
| 2009/0016599 | A1* | 1/2009 | Eaton | G06K 9/00335 382/159 |
| 2010/0057481 | A1* | 3/2010 | Fein | G06Q 30/02 705/1.1 |
| 2010/0100424 | A1* | 4/2010 | Buchanan | G06Q 20/10 705/35 |
| 2010/0145784 | A1* | 6/2010 | Sriver | G01C 21/20 705/14.25 |
| 2010/0161720 | A1* | 6/2010 | Colligan | G06Q 30/02 709/203 |
| 2010/0332315 | A1* | 12/2010 | Kamar | G06Q 30/02 705/14.46 |
| 2011/0040642 | A1* | 2/2011 | O'Dell | G06F 17/30241 705/26.1 |
| 2012/0041779 | A1* | 2/2012 | Boroczky | G06Q 50/22 705/2 |
| 2015/0120599 | A1 | 4/2015 | Deshpande et al. | |

OTHER PUBLICATIONS

Ajay A. Deshpande, "Partner Marketing Based on an Expected Customer Visit" U.S. Appl. No. 14/529,925, filed Oct. 31, 2014.
Ajay A. Deshpande, "Partner Marketing and Order Fulfillment Based on Partner Merchant Shipping Efficiencies" U.S. Appl. No. 14/742,758, filed Jun. 18, 2015.
Ajay A. Deshpande, "Customer Purchasing Preference Profiles Based on Coupon Choices" U.S. Appl. No. 14/745,707, filed Jun. 22, 2015.
Ajay A. Deshpande, "Pop-Up Store Logistics Management System" U.S. Appl. No. 14/745,670, filed Jun. 22, 2015.
Ajay A. Deshpande, et al; U.S. Appl. No. 14/510,636; "Logistics Management System for Determining Pickup Routesfor Retail Stores"; filed Oct. 9, 2014.
Ajay A. Deshpande, "Logistics Management System for Determining Pickup Routes for Retail Stores" U.S. Appl. No. 14/745,687, filed Jun. 22, 2015.
Ajay A. Deshpande, "Customer Purchasing Preference Profiles Based on Coupon Choices" U.S. Appl. No. 14/510,643, filed Oct. 9, 2014.
Ajay A. Deshpande, "Development of Dynamic Business Data for Marketing to Moving Spatiotemporal Phenomena and Events" U.S. Appl. No. 14/742,870, filed Jun. 18, 2015.
Ajay A. Deshpande, "Development of Dynamic Business Data for Marketing to Moving Spatiotemporal Phenomena and Events" U.S. Appl. No. 14/529,936, filed Oct. 31, 2014.
Ajay A. Deshpande, "Pop-Up Store Logistics Management System" U.S. Appl. No. 14/510,632, filed Oct. 9, 2014.
List of IBM Patents or Patent Applications Treated As Related; filed Jun. 18, 2015, 2 pages.

* cited by examiner

FIG. 6

COMMUNICATING WITH A CUSTOMER TRAVELING ON A ROUTE TO A LOCATION

DOMESTIC PRIORITY

The present application claims priority to U.S. Nonprovisional application Ser. No. 14/529,925 filed on Oct. 31, 2014, titled "PARTNER MARKETING BASED ON AN EXPECTED CUSTOMER VISIT", which claims the benefit of provisional patent application Ser. No. 61/897,888, titled "SYSTEM AND METHOD FOR PARTNER MARKETING FOR BUY ONLINE AND PICKUP IN STORE," filed Oct. 31, 2013, assigned to the assignee hereof and expressly incorporated by reference herein.

BACKGROUND

The present disclosure relates in general to computer systems, and more specifically to cognitive computer systems and computer-implemented methods for communicating with a customer based on a cognitive determination that the customer is expected to travel on a route to a store location.

The phrase "brick-and-mortar" merchant refers to a business that is located in a building as opposed to an online shopping destination, door-to-door sales, a kiosk or other similar site not housed within a structure. A traditional brick-and-mortar company deals with its customers face to face in an office or store that the business owns or rents. The local grocery store and the corner bank are examples of brick-and-mortar companies. Brick-and-mortar businesses can find it challenging to compete with web-based, online-only businesses because the latter usually have lower inventory and operating costs and greater flexibility in terms of hours of operation, assortment range and pricing offers.

It is increasingly common for brick-and-mortar businesses to also have an online presence. As a response to their online-only competitors, many retailers also offer merchandise for sale through the retailer's website, thus offering customers substantially the same online convenience provided by online-only retailers. Some brick-and-mortar grocery stores, for example, allow customers to shop for groceries online and have them delivered directly to their doorstep within a few hours.

Another strategy adopted by brick-and-mortar merchants to compete with online-only merchants is to offer buy-online-pick-up-in-store (BOPIS) transactions as a purchase option to their customers. In a typical BOPIS transaction, customers find the item they want online, where they also check its availability at a nearby brick-and-mortar store location. If the product is in stock, the customer can purchase the item online and find it ready for pick-up at the local store, generally within one to three hours. For certain products that are not in stock, the seller may also offer customers a free delivery to the local store, where the customer can pick-up the item after receiving notification that the item has arrived.

SUMMARY

Embodiments are directed to a computer implemented method of selecting a partner marketing communication. The method includes receiving, by a processor circuit, data of a potential visit by a customer to a location. The method further includes making a determination, by the processor, based at least in part on the data of the potential visit by the customer to the location, that the customer or an agent of the customer may travel to the location. The method further includes selecting, by the processor circuit, at least one partner marketing communication from among a plurality of available partner marketing communications based at least in part on the data of the potential visit and the determination that the customer or the agent may travel to the location.

Embodiments are further directed to a computer program product for selecting a partner marketing communication. The computer program product includes a computer readable storage medium having program instructions embodied therewith, wherein the computer readable storage medium is not a transitory signal per se. The program instructions are readable by a processor circuit to cause the processor circuit to perform a method. The method includes receiving, by the processor circuit, data of a potential visit by a customer to a location. The method further includes making a determination, by the processor circuit, based at least in part on the data of the potential visit by the customer to the location, that the customer or an agent of the customer may travel to the location. The method further includes selecting, by the processor circuit, at least one partner marketing communication from among a plurality of available partner marketing communications based at least in part on the data of the potential visit and the determination that the customer or the agent may travel to the location.

Embodiments are further directed to a computer system for selecting a partner marketing communication. The system includes a processor circuit configured to receive data of a potential visit by a customer to a location. The processor circuit is further configured to make a determination, based at least in part on the data of the potential visit by the customer to the location, that the customer or an agent of the customer may travel to the location. The processor circuit is further configured to select at least one partner marketing communication from among a plurality of available partner marketing communications based at least in part on the data of the potential visit and the determination that the customer or the agent may travel to the location.

Additional features and advantages are realized through techniques described herein. Other embodiments and aspects are described in detail herein. For a better understanding, refer to the description and to the drawings.

BRIEF DESCRIPTION OF THE SEVERAL VIEWS OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

FIG. 6 depicts a diagram illustrating an example of a system and methodology for displaying selected partner marketing communications to customers according to one or more embodiments;

DETAILED DESCRIPTION

Figure 1:
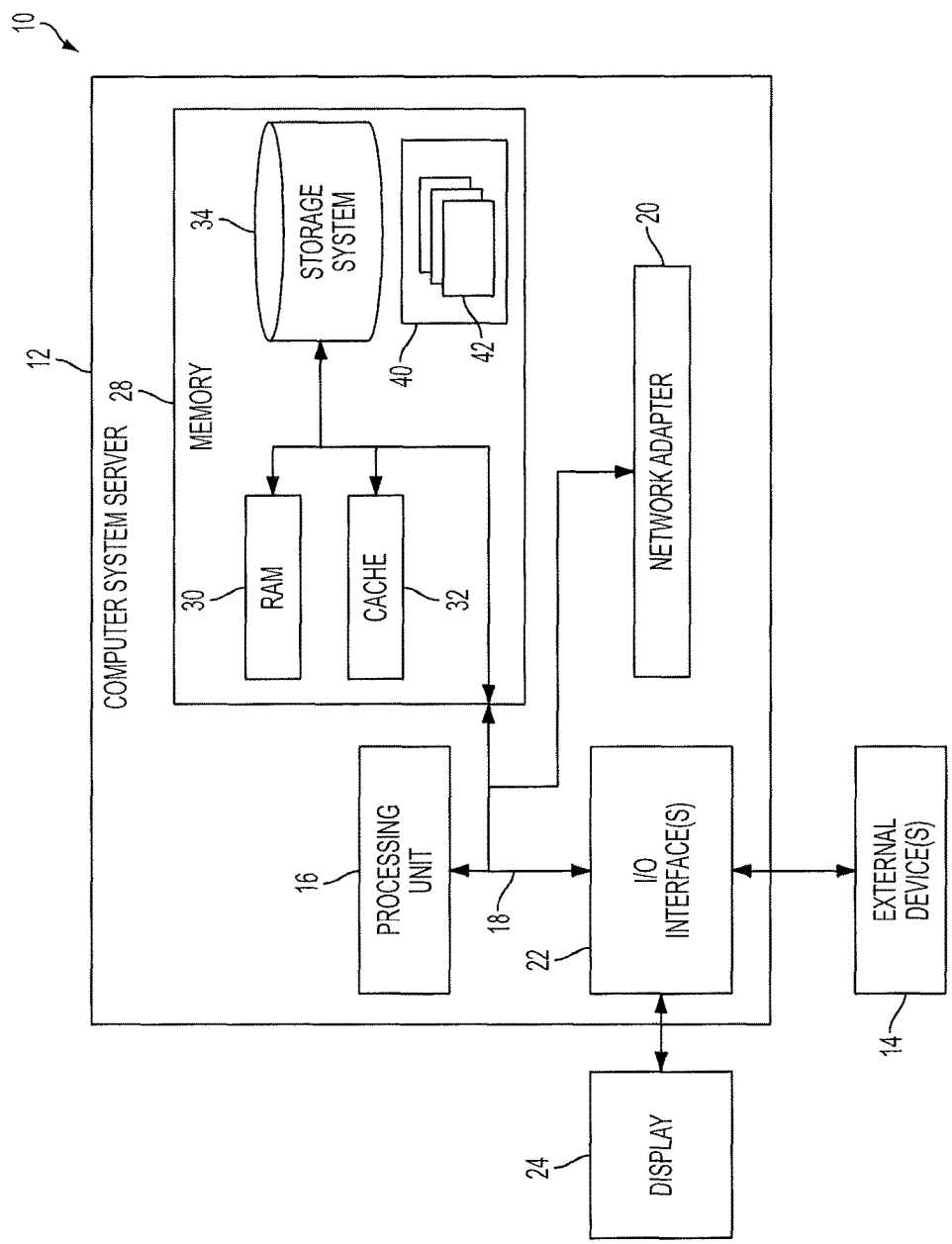
FIG. 1 depicts a cloud computing node according to one or more embodiments.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Turning now to a description of a cloud computing environment capable of implementing and/or supporting the present disclosure, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, et cetera.

Figure 2:
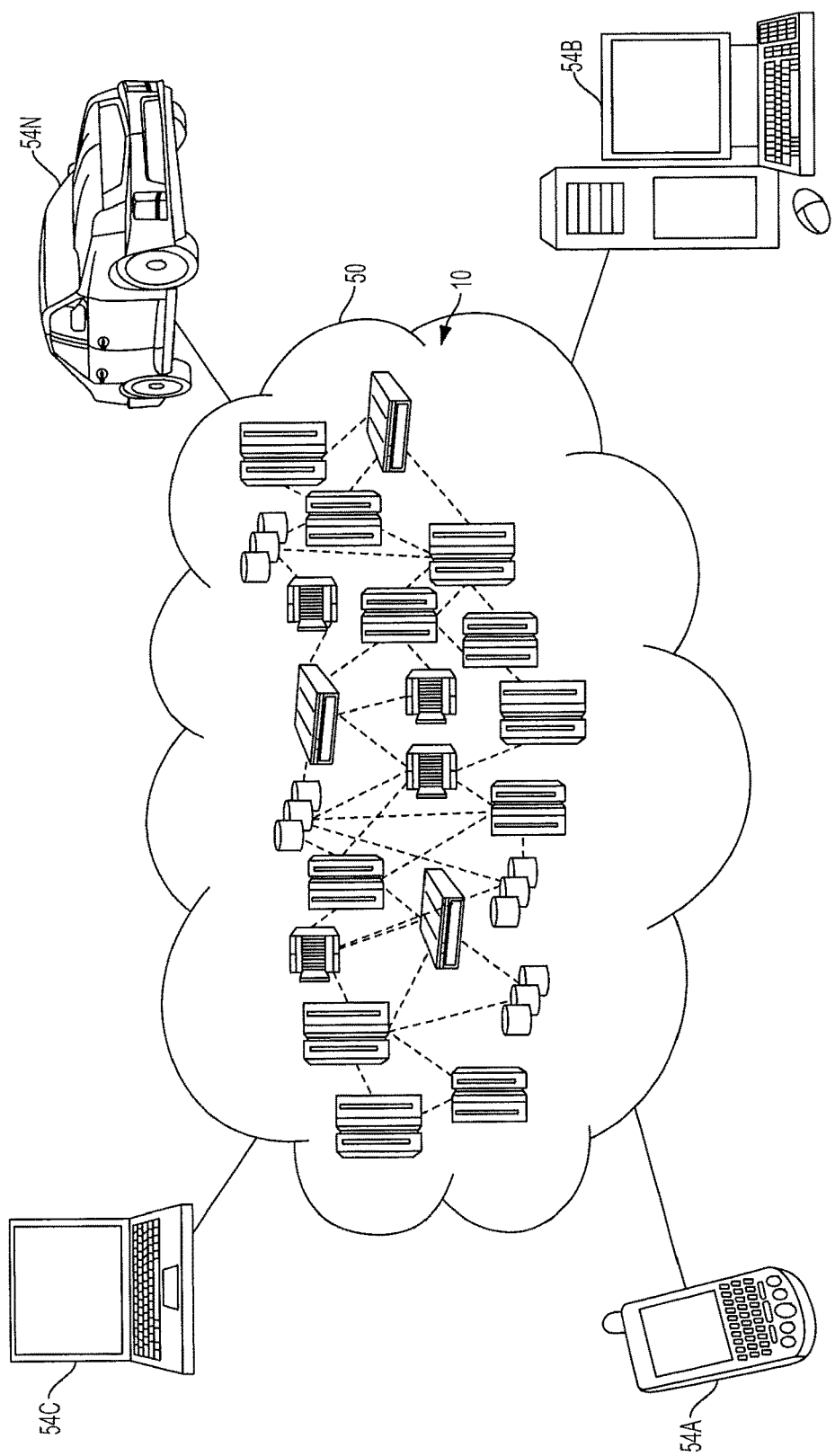
FIG. 2 depicts a cloud computing environment according to one or more embodiments.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
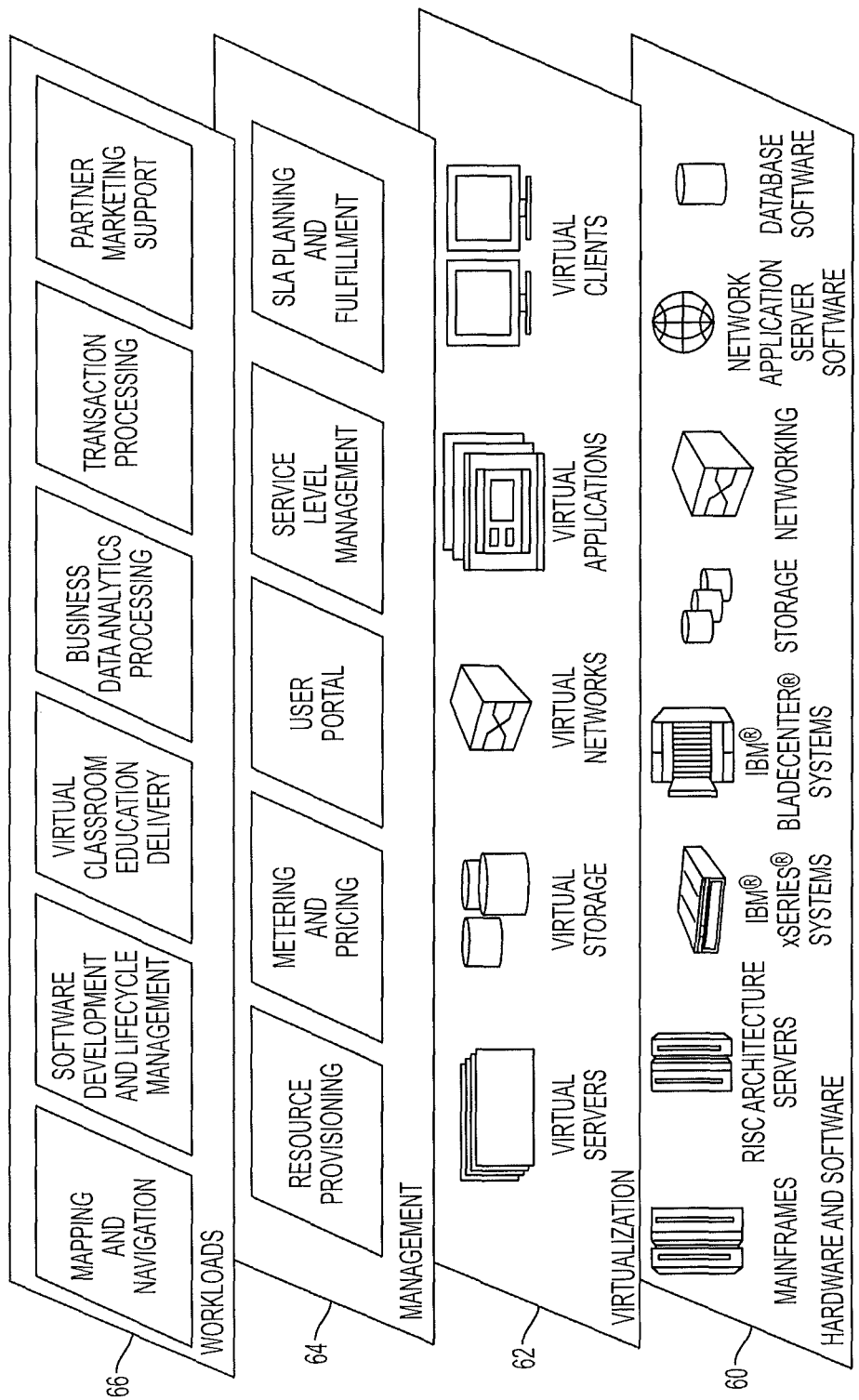
FIG. 3 depicts abstraction model layers according to one or more embodiments.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2®, database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Figure 4:
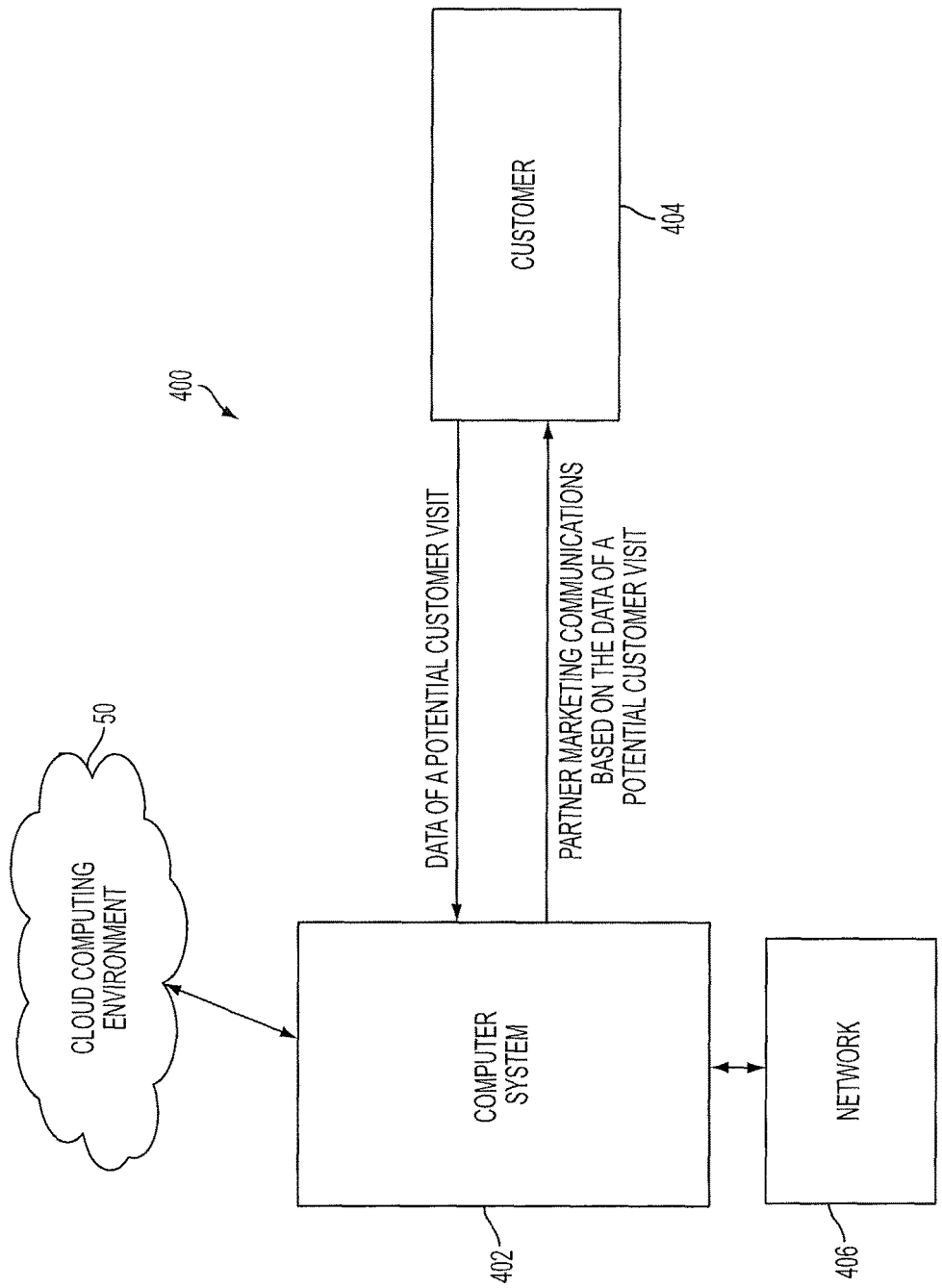
FIG. 4 depicts a diagram of a system and methodology for selecting partner marketing communications according to one or more embodiments.
Figure 5:
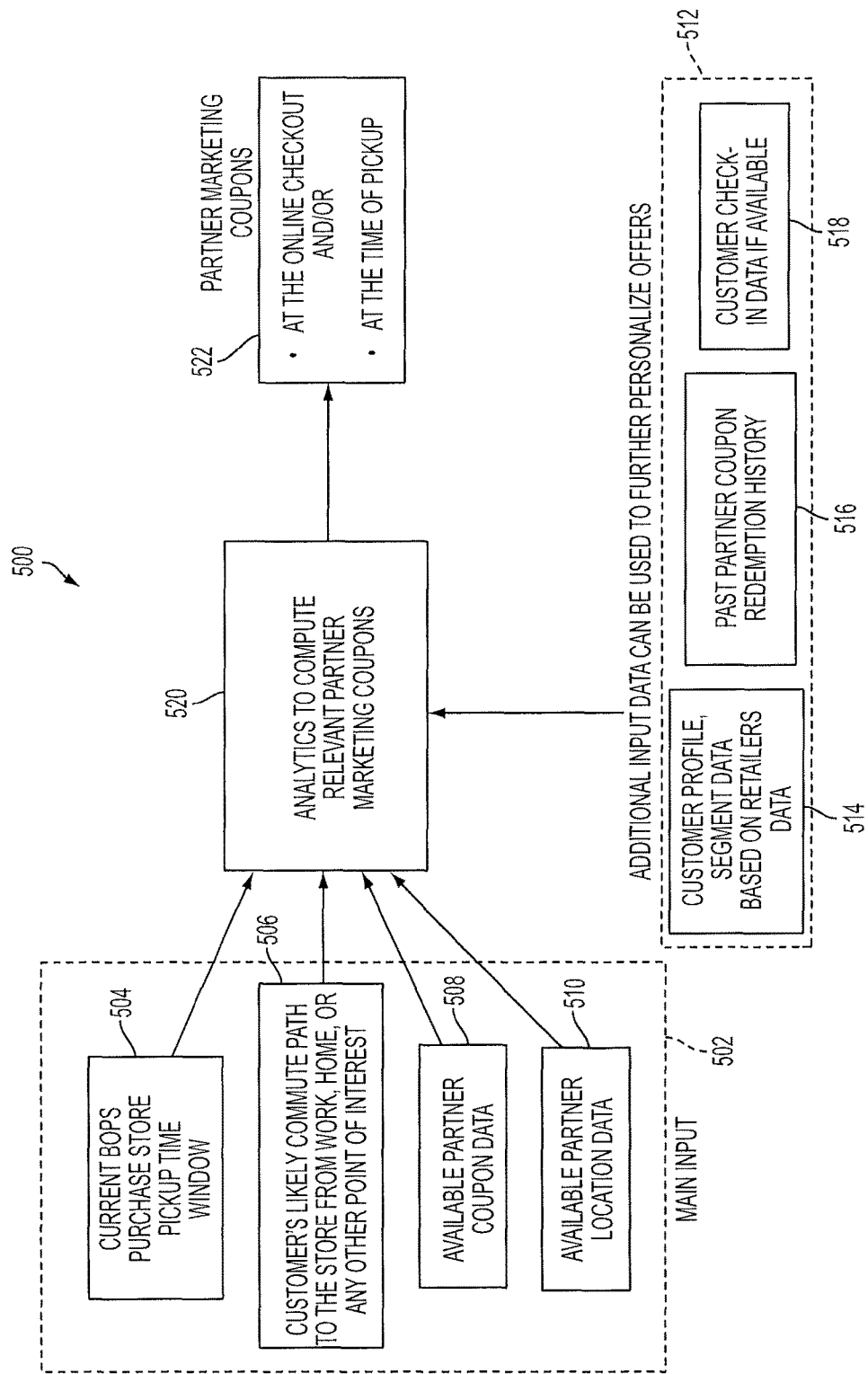
FIG. 5 depicts a diagram illustrating an example of another system and methodology for selecting partner marketing communications according to one or more embodiments.
Figure 8:
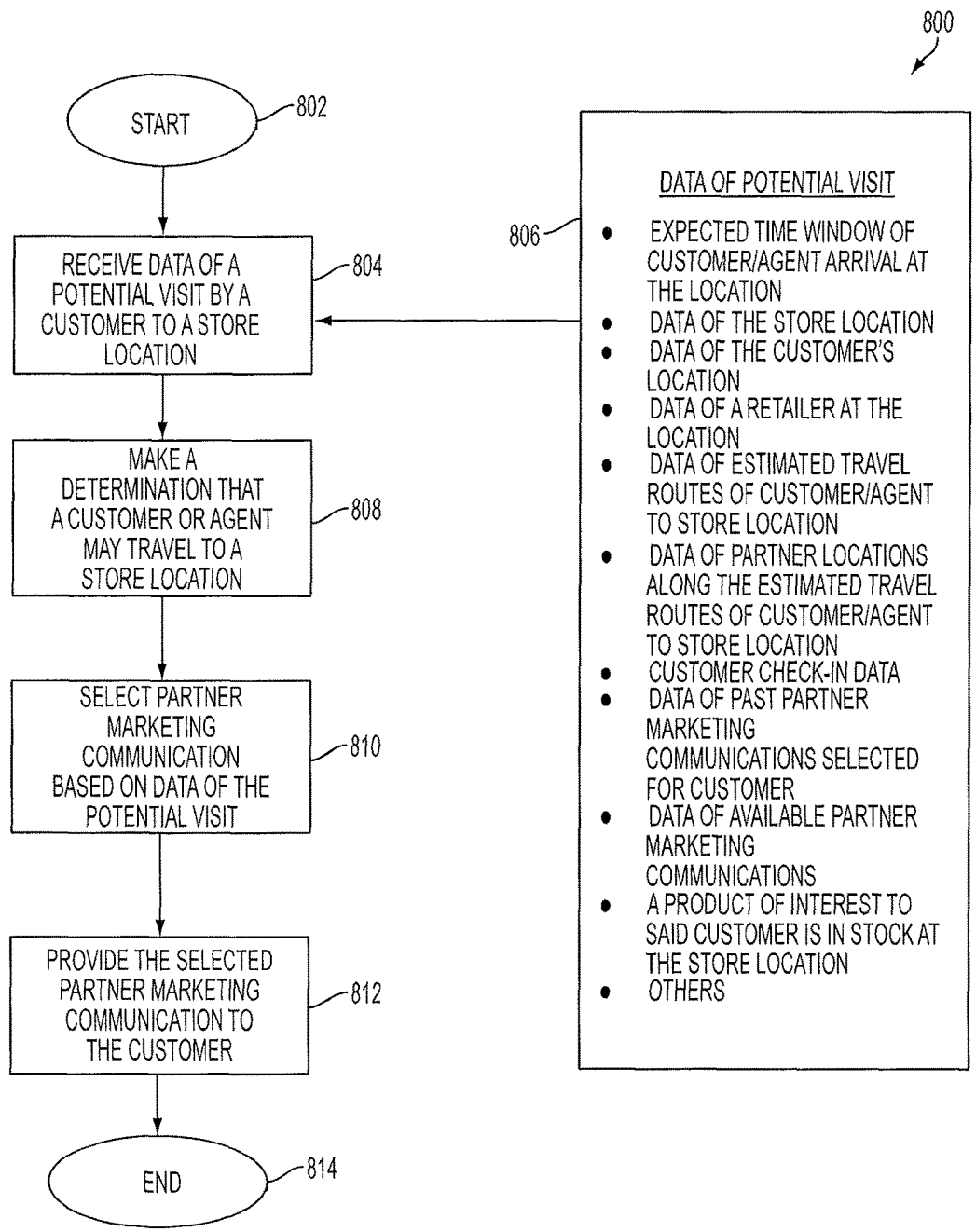
FIG. 8 is a flow diagram illustrating a methodology according to one or more embodiments.

Workloads layer 66 provides examples of functionality for which the cloud computing environment may be utilized. Examples of workloads and functions which may be provided from this layer include: mapping and navigation; software development and lifecycle management; virtual classroom education delivery; business data analytics processing; transaction processing; and a wide variety of support activities for selecting partner marketing communications. An example of a workload 66 that may be implemented and/or supported by cloud computing environment 50 and nodes 10 is support for a partner marketing communication system, examples of which are illustrated in FIGS. 4, 5 and 8 by reference numbers 400, 500 and 800, respectively.

Turning now to a discussion of background information relevant to the present disclosure, as previously noted, brick-and-mortar businesses can find it challenging to compete with web-based, online-only businesses because the latter usually have lower operating costs and greater flexibility in terms of hours of operation, assortment range and pricing offers. It is therefore increasingly common for brick-and-mortar businesses to also have an online presence. As a response to online-only competitors, many retailers also offer merchandise for sale through the retailer's own website, thus offering customers substantially the online mail-order convenience provided by online-only retailers. Some brick-and-mortar grocery stores, for example, allow customers to shop for groceries online and have them delivered to their doorstep within a few hours.

Another strategy adopted by brick-and-mortar merchants to compete with online-only merchants is to offer BOPIS transaction options to their customers. In a typical BOPIS transaction, customers find the item they want online, where they also check its availability at a nearby brick-and-mortar. BOPIS transactions are also known as "reserve and collect" or "click and collect." If the product is in stock, they can purchase it online and find it ready for pick-up at the local store, generally within one to three hours. For certain products that are not in stock, the seller may also offer a free delivery to the local store, where the customer can pick-up the item after receiving notification that it has arrived. Other merchants offer "pay in store" options that allow a customer to reserve an item online, pay for the item in the store, and leave either with the item or a shipment confirmation that the item will be sent to the customer's home. The customer is given a 48 hour time window to visit the store and complete the transaction. It has been observed that BOPIS and similar transactions are increasing among shoppers because they save the shoppers' time, potentially avoid shipping costs and allow for inspection of the item before finalizing the purchase. A common thread among BOPIS and similar transactions is that they provide a reliable way for customers to determine the availability of an item of interest in inventory. Once customers know that an item is available in stock at a particular store location, a visit to that store location is likely to follow.

Another effective strategy in competing for business is known as a "marketing partnership" or "partner marketing." Partner marketing involves two or more professionals, companies or salespeople who have common prospects, similar marketing needs, and possibly complementary services. These entities join forces for mutual marketing and sales synergies, usually within a specific market sector, geographic area or for specific prospects. Typically, each company maintains its individual status and continues to market and sell outside the partnership. Partner marketing activities may involve one partner offering marketing communications (e.g., coupons, sale notices, et cetera) of another partner, creating joint marketing materials, joint direct mail, e-mail or advertising campaigns, joint sales calls, referring of prospects, and possibly even combining services, talents and assets to create new services. An example of a potential marketing partnership would be an accountant, estate attorney, financial planner, and insurance agent. By combining forces, these professionals can, at least in theory, coordinate and help guide an individual's affairs without the potential of conflict, jealousy, or competition. Each individual professional benefits from wider exposure, more referrals, and marketing that is more efficient. In addition, where it can be shown that one partner's partner marketing efforts led to a sale by another partner, partner may agree to allow a referring partner to share revenue from the identified sale. An example is where it can be confirmed that certain coupons offered to partner A's customers for a partner B product are redeemed, partner A may share revenue on those sales.

Turning now to an overview of the present disclosure, one or more embodiments relate in general to partner marketing, and more specifically to systems and methodologies for selecting a partner marketing communication based on a determination that a customer is expected to travel to a particular store location based on shopping behavior history and other customer, competitor or market factors. FIG. 4 depicts a high level diagram of a partner marketing system 400 and methodology according to one or more embodiments. Partner marketing system 400 includes a computer system 402 in two-way communication with a customer 404 and a network 406. Computer system 402 may be implemented as a node 10 (shown in FIG. 1) of cloud computing environment 50 (shown in FIG. 2). Accordingly, some or all of the functionality of computer system 402 may be supported by cloud computing environment 50. Customer 404 provides computer system 402 with data of a potential visit by customer 404 to a store location (not shown). Additional data of the potential visit may be obtained from other data sources connected through network 406 and/or cloud computing environment 50. Network 406 connects computer system 402 to additional systems (not depicted) and may include one or more wide area networks (WANs) and/or local area networks (LANs) such as the internet, intranet(s), and/or wireless communication network(s). Computer system 402 and additional systems are in communication via network 406, e.g., to communicate data between them.

The data of a potential visit may take a number of formats. One example format is as an inquiry about whether a product of interest to customer 404 is in stock at the store location. Another example format is customer 404 initiating a BOPIS or similar transaction for the product of interest, which will require a visit to the store location. Another example format is customer 404 providing a direct indication that he/she intends to travel to the store location and pick up the product of interest within a time window, for example between 7:00 PM and 10:00 PM on Thursday evening. Another example format is an estimate of the expected routes customer 404 is likely to take when traveling to the store location between 7:00 PM and 10:00 PM on Thursday evening. Another example format is the expected weather conditions when customer 404 is traveling to the store location between 7:00 PM and 10:00 PM on Thursday evening. The data of a potential visit by the customer to a store location may also include data about the customer, the store location, the product of interest, et cetera. For example, the data of a potential visit by the customer may also include data about the customer's food preferences (e.g., vegetarian) in order to create a bundled offer that spans multiple partners to solve a customer need state. In sum, the data of a potential customer visit may be any information relevant to the customer's expected visit, including but not limited to information about the customer, the product of interest, the store location, the partner, et cetera.

Computer system 402 uses the received data of a potential visit by customer 404 to a store location to determine that customer 404 may visit the store location. Computer system 402 then selects from a database of potential partner marketing communications (not shown) at least one partner marketing communication that, based at least in part on the data of the potential visit, and based at least in part on computer system 402 determining that customer 404 may visit the store location, may be of interest to customer 404. For example, based on customer 404 planning to travel to the store location near the dinner hour, and based on a determination that there are 3 most likely routes for customer 404 to take when traveling to the store location, computer system 402 would search the available partner marketing communications to identify any partner marketing communications for a partner merchant food establishment located along one of the likely routes. For example, among the available partner marketing communications computer system 402 may locate a 20% off coupon for a partner merchant food establishment located along one of the likely routes. Computer system 402 would provide this coupon to customer 404 along with a communication that the partner merchant food establishment is only 1.5 miles from ABC Pickup Store going north on Route 45.

The communication channels between computer system 402 and customer 404 may take a variety of formats. Preferably, at least part of the communication channels is a network-based electronic communication channel such as an internet communication channel or a private network channel. However, the communication channels may also include a voice communication channel over the public switched telephone network (PSTN) or a cellular network. It is understood that partner marketing system 400 may also include a customer service representative (not shown) to receive any voice communications from customer 404 and interact with computer system 402 to carry out the operations described herein. The communication channels may also include in person communication with customer 404 when he/she arrives at the store location. The communication channels may also be a combination of different types of communication channels. For example, customer 404 may provide data of a potential visit during a phone call to the customer service representative, and the selected partner marketing communication may be provided by a subsequent text message to a cellular telephone of customer 404. In addition to the increased market exposure for each partner participating in a partner marketing arrangement, the partners may also implement a method to share part of the revenue from sales when a customer redeems a partner marketed coupon at the partner merchant.

FIG. 5 depicts a diagram illustrating an example of another partner marketing system 500 for selecting partner marketing communications according to one or more embodiments. Some or all of the functionality of partner marketing system 500 may be supported by cloud computing environment 50 (shown in FIG. 2). Partner marketing system 500 focuses on the particular situation where the data of a potential visit by the customer to a store location includes a BOPIS transaction initiated by the customer. Partner marketing system 500 includes main inputs 502, a BOPIS time window 504, customer's likely commute 506, data of available partner coupons 508, partner location data 510, additional input data 512, customer profile data 514, past partner coupon redemptions 516, customer check-in data 518, analytics 520 and partner marketing coupons 522, configured and arranged as shown. Check-in data is location data accumulated by many geo-social media sites to essentially track an individual's visit to the site. Additionally, geo-social media sites also gather data from individuals about their star rating and feedback about the site. The latter is also known as a tip. Check-in information is further utilized to derive additional data such as the number of unique visitors and time spent by visitors at a particular site during a certain time window. Check-in data, site rating, social feedback and any other derived data may also be utilized to further customize partner marketing offers.

In operation, analytics 520 determine that a particular customer may travel to a store location. In the BOPIS example, this determination is based on explicit data from the BOPIS transaction. In other instances, the determination of a potential customer visit may be inferred from other customer activity, such as an online customer checking the availability of a particular item at a particular store location. After determining that the customer may visit a particular store location, analytics 520 uses main input data 502 and additional input data 512 to compute relevant partner marketing coupons 522 which may be offered to the customer during an online session or at the time of pickup. In general, this functionality of analytics 520 may be implemented by a variety of mechanisms. Main input data 502 and additional input data 512 may be stored in a lookup table (not shown) in memory. Analytics 520 may be programmed to search the lookup table and select data stored therein based on keyword search criteria derived from data of the potential customer visit. The search criteria may also be implemented using a more sophisticated expression-based, cognitive data analysis technology such as IBM Watson®. Expression-based cognitive technology processes information more like a human than a computer, through understanding natural language, generating hypotheses based on evidence and learning as it goes.

In one embodiment, after selecting relevant main inputs 502 and additional inputs 512, a computational mechanism of analytics 520 may compute a score for each available offer based on weighted scores attached to selected main inputs 502 and/or additional inputs 512. Main inputs 502 and/or additional inputs 512 may be selectively included or excluded by the mechanism based on the priorities of the partner merchants. The weighting accounts for relative importance of main inputs 502 and/or additional inputs 512 taking into account the overall business and marketing priories of the partner marketers. Thresholds may be established for scores, and the score for a given partner marketing communication and for a given customer may be evaluated based on a linear combination of weights. For example, if the arriving time window is in the evening between 6:30 pm and 8:30 pm, a dining restaurant offer is given a high weight in the scoring. During the summer season, a partner offer from an ice cream shop or frozen yogurt shop may be given a high weight in the scoring. It is contemplated that a wide variety of implementations of analytics 520 are within the scope of the present disclosure.

Partner marketing coupon offers are made to a BOPIS customer planning to pick up items in the store during a specific time window. Partner marketing offers may be made at the online checkout and/or when the customer is in the store to pickup items. Partner marketing coupon offers are designed based on a variety of factors, including but not limited to the store location, partner locations, available partner coupons, person's likely commute path and time of pickup. Partner coupons may be further personalized based on the customer segment, past customer redemptions, customer check-in data in other places, et cetera.

Figure 6:
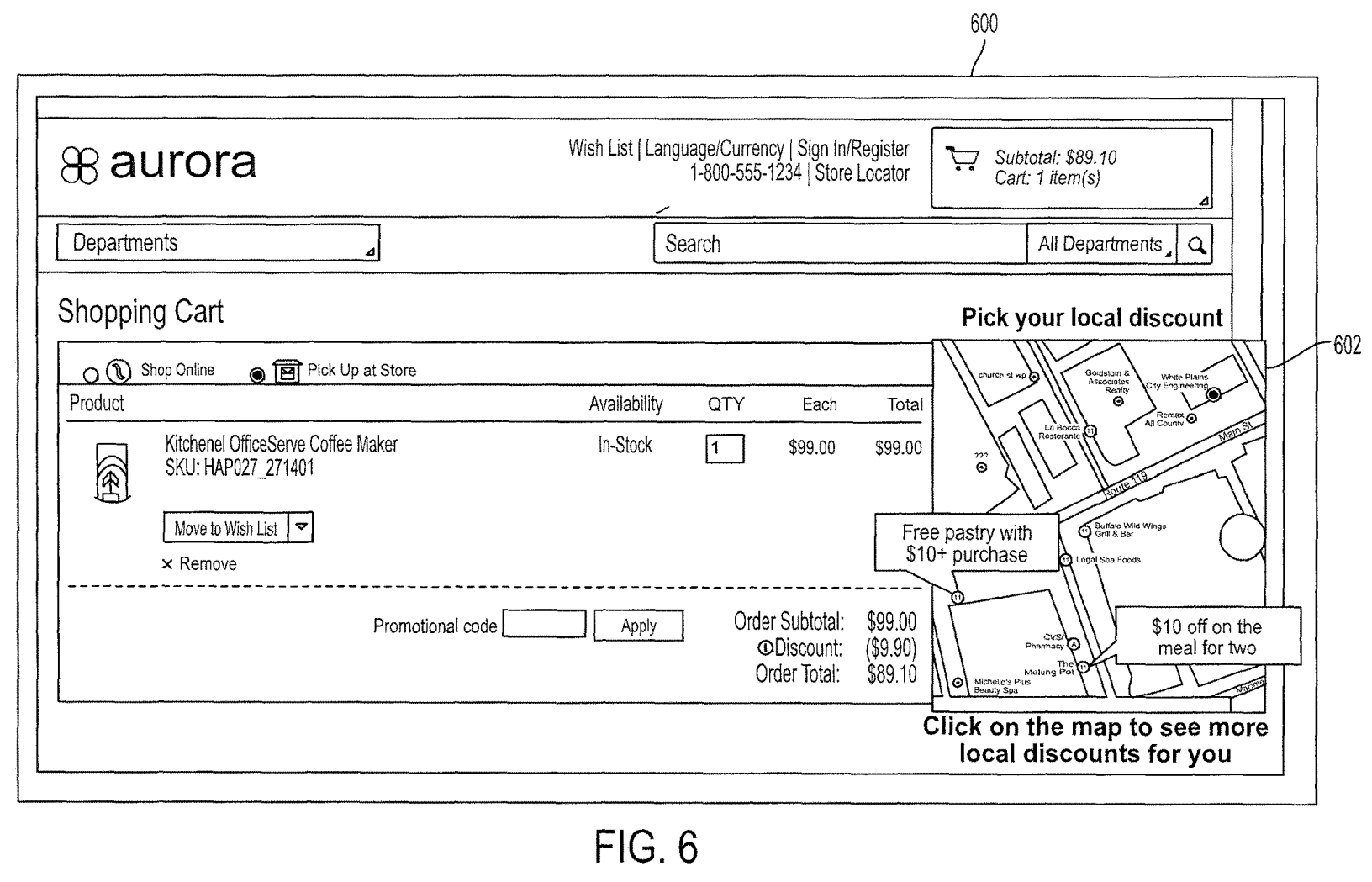

FIG. 6 depicts a screenshot 600 illustrating an example of how partner marketing communications may be provided to the customer. As shown in FIG. 6, a map area 602 provides the selected partner marketing communications graphically. If the customer has indicated a plan to pick up an item in the evening, it is possible that the customer may be interested in having dinner or an evening dessert at a nearby partner shop. Relevant partner coupons may be shown on map 602 at the time of online checkout. Similar offers can be made when the customer is in store. Partner marketing communications can be targeted based on the customer segment. For example, if it is determined that the customer may be a vegetarian, coupons relevant to partner vegetarian restaurants or partner vegetarian meal offerings are made.

Figure 7:
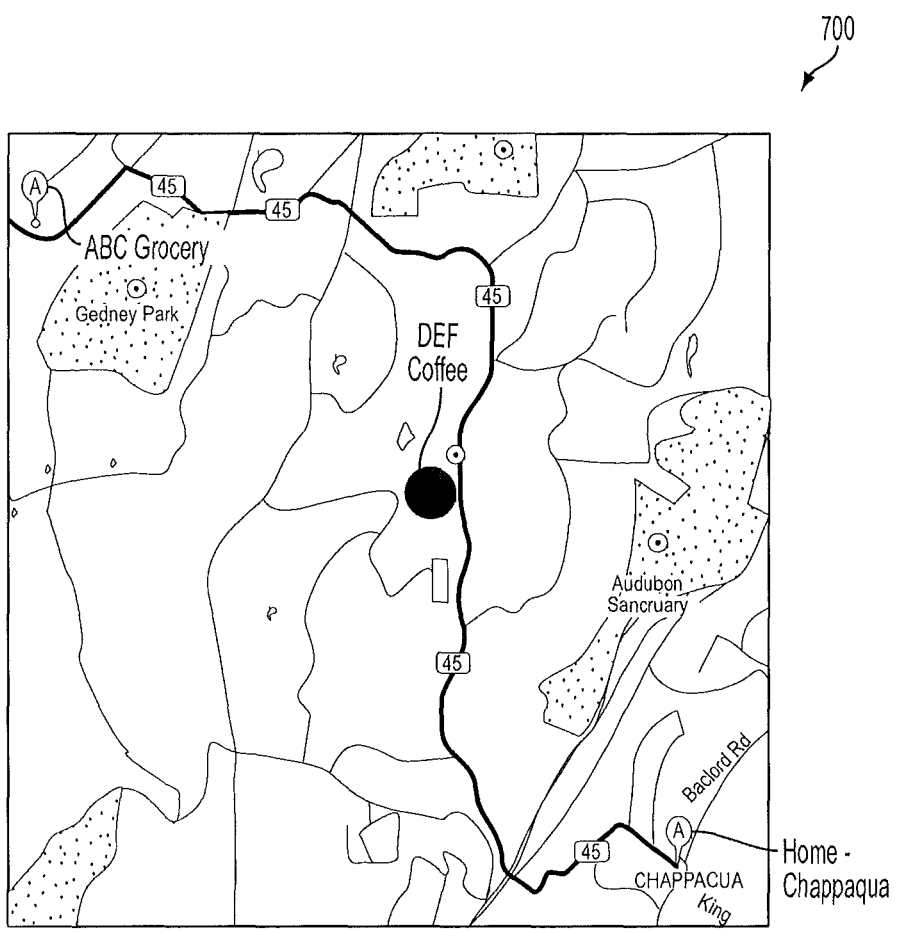
FIG. 7 depicts a diagram illustrating another example of a system and methodology for displaying selected partner marketing communications to customers according to one or more embodiments.

FIG. 7 depicts another example of a map area 700 that conveys the selected partner marketing communications graphically. As shown by map area 700, a customer has ordered groceries on a Saturday morning from ABC Grocery and notified ABC Grocery of plans to pick up the groceries in the afternoon. Analytics 520 (shown in FIG. 5) determine that partner coffee shop DEF Coffee is on a likely travel route from the customer's home to ABC Grocery and offers the customer DEF Coffee coupons. The selected partner marketing coupons may be offered during the customer's online session, or when the customer is in the store, or at both times.

FIG. 8 is a flow diagram illustrating a partner marketing methodology 800 according to one or more embodiments. Methodology 800 begins at block 802 and moves to block 804 to receive data of a potential visit by a customer to a store location. Block 806 feeds into block 804 and provides various data of the potential visit. The data of the potential visit includes, but are not limited to, an expected time window of customer/agent arrival at the store location, data of the store location, data of the customer's location, data of a retailer at the location, data of estimated travel routes of the customer/agent to the store location, data of partner locations along the estimated travel routes of the customer/agent to the store location, customer check-in data, data of past partner marketing communications selected for the customer, data of available partner marketing communication, that a product of interest to the customer is in stock at the location, and other data that are relevant to the customer's visit and may be useful in identifying and selecting partner marketing communications that may be of interest to the customer. Optionally, the above-noted customer's expected arrival time window may be based on an expressed intention by the customer that the customer or an agent of the customer will arrive at the store location during the expected arrival time window. The data of the potential visit may be supplied by a variety of sources including the customer, partner merchants, GPS location technology and others.

At block 808, the data of a potential visit received at block 804 is analyzed to make a determination that the customer or an agent of the customer may a travel to the store location. At block 810 at least one partner marketing communication is selected from among a plurality of available partner marketing communications based at least in part on the data of the potential visit. Preferably, the at least one partner marketing communication is also selected from among a plurality of available partner marketing communications based at least in part on the determination that the customer or the agent of the customer may travel to the location.

At block 812, the selected partner marketing communication is provided to the customer. Preferably, the selected partner marketing communication is provided to the customer over an internet communications channel, over a wireless communications channel, or to the customer or the agent of the customer at the store location. Methodology 800 ends at block 814.

Thus, it can be seen from the forgoing detailed description that embodiments of the present disclosure include system and methodologies to compute relevant partner marketing communications (e.g., partner marketing coupons) for the customer who plans to visit a store location, for example when the customer executes a BOPIS transaction online and expresses an intention to pick up the merchandise at the store within a window of time. Partner marketing communications are offered to the customer either during the online session, when the customer is in the store to pick up the order, or both. One or more partner marketing communications may be made. In cases where multiple partner merchant discounts are relevant and selected, a customer may be asked to choose a limited number of the discount offers.

The present disclosure is applicable to any data that may indicate or imply that the customer will visit a particular store location. The data may include a certain time window for the visit and a likely commute path. In addition to the increased market exposure for each partner utilizing the present disclosure, the present disclosure may also facilitate revenue sharing opportunities for partners that have such provisions in their partner marketing agreement. For example, a typical partner marketing agreement may allow Partner A to share part of the revenue from sales in which a customer redeems at Partner B a partner marketed coupon issued by Partner A.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer implemented method of communicating with a customer based on determining that the customer may travel on a route to a location of a merchant, the computer implemented method comprising:
   receiving, by a processor circuit, customer activity data associated with interactions by the customer with the merchant, wherein the customer activity data includes natural language data;
   wherein the interactions by the customer with the merchant comprises the customer initiating, during an on-line session with a website of the merchant, a buy-online-pickup-in-store (BOPIS) transaction;
   wherein the customer activity comprises submitting at the website of the merchant an inquiry as to whether a product associated with the BOPIS transaction is in stock at the location of the merchant;
   applying a first cognitive learning process comprising learning to infer, using a natural language learning-based cognitive analysis function of the processor circuit, based at least in part on the natural language data of the customer activity data, that the customer may travel to the location of the merchant;
   wherein application of the first cognitive learning process results in the processor circuit being configured to infer that the customer may travel to the location of the merchant;
   generating, using the processor circuit, a learned inference that the customer may travel to the location;
   applying a second cognitive learning process comprising learning to infer, using the natural language learning-based cognitive analysis function of the processor circuit, based at least in part on the natural language data of the customer activity data and the learned inference that the customer may travel to the location of the merchant, that the customer or an agent of the customer may use at least one potential customer travel route when traveling to the location of the merchant;
   wherein application of the second cognitive learning process results in the processor circuit being configured to infer that the customer or the agent of the customer may use the at least one potential customer travel route when traveling to the location of the merchant;
   generating, using the processor circuit, a learned inference that the customer or the agent of the customer may use the at least one potential customer travel route when traveling to the location of the merchant;
   selecting, using the processor circuit, at least one partner marketing communication from among a plurality of available partner marketing communications based at least in part on:
   the learned inference that the customer or the agent may travel to the location of the merchant along the at least one potential customer travel route;
   the learned inference that the customer or the agent of the customer may use the at least one potential customer travel route when traveling to the location of the merchant; and
   a determination that a partner merchant location associated with the at least one partner marketing communication is on the at least one potential customer travel route.

2. The computer implemented method of claim 1 further comprising:
   providing the at least one partner marketing communication to the customer;
   wherein the at least one partner marketing communication comprises a partner marketing coupon.

3. The computer implemented method of claim 1 further comprising:
   providing the at least one partner marketing communication to the customer over an internet channel.

4. The computer implemented method of claim 1 further comprising:
   providing the at least one partner marketing communication to the customer over a wireless communications channel.

5. The computer implemented method of claim 1 further comprising:
   providing the at least one partner marketing communication to the customer or to the agent at the location of the merchant.

6. The computer implemented method of claim 1, wherein selecting the at least one partner marketing communication from among the plurality of available partner marketing communications is accomplished at least in part by using a natural language processor of the processor circuit.

7. The computer implemented method of claim 1 further comprising generating, using the processor circuit, data of a graphical map comprising data representing:
   the at least one partner marking communication;
   the at least one potential customer travel route; and
   the location of the merchant on the at least one potential customer travel route.

8. The computer implemented method of claim 7 further comprising using the data of the graphical map to display the graphical map.

9. The computer implemented method of claim 1 further comprising receiving, by the processor circuit, the customer activity data through a cloud computing environment.

10. A computer implemented method of selecting and targeting a communication with a customer based on determining that the customer may travel on a route to a location of a merchant, the computer implemented method comprising:
    receiving, by a processor circuit, customer activity data associated with interactions by the customer with the merchant, wherein the customer activity data includes natural language data;
    wherein the interactions by the customer with the merchant comprises the customer initiating, during an on-line session with a website of the merchant, a buy-online-pickup-in-store (BOPIS) transaction;
    wherein the customer activity comprises submitting at the website of the merchant an inquiry as to whether a product associated with the BOPIS transaction is in stock at a location of the merchant;
    applying a first cognitive learning process comprising learning to infer, using a natural language learning-based cognitive analysis function of the processor circuit, based at least in part on the natural language data of the customer activity data, that the customer may travel to the location of the merchant;

wherein application of the first cognitive learning process results in the processor circuit being configured to infer that the customer may travel to the location of the merchant;

generating, using the processor circuit, a learned inference that the customer may travel to the location;

applying a second cognitive learning process comprising learning to infer, using the natural language learning-based cognitive analysis function of the processor circuit, based at least in part on natural language data of the customer activity data and the learned inference that the customer may travel to the location of the merchant, that the customer or an agent of the customer may use at least one potential customer travel route when traveling to the location of the merchant;

wherein application of the second cognitive learning process results in the processor circuit being configured to infer that the customer or the agent of the customer may use the at least one potential customer travel route when traveling to the location of the merchant;

generating, using the processor circuit, a learned inference that the customer or the agent of the customer may use the at least one potential customer travel route when traveling to the location of the merchant;

selecting, using the processor circuit, at least one partner marketing communication from among a plurality of available partner marketing communications based at least in part on:

the learned inference that the customer or the agent may travel to the location;

the learned inference that the customer or the agent may use the at least one potential customer travel route when traveling to the location of the merchant; and a determination that a partner merchant location associated with the partner marketing communication is located within a predetermined area around the location of the merchant, wherein the predetermined area around the location of the merchant includes at least a portion of the at least one potential customer travel routes, wherein the predetermined area around the location of the merchant is selected to be sufficient to display on a predetermined area of a computer display; and generating data of a graphical map comprising data representing:

the at least one partner marking communication;

the location of the merchant; and the predetermined area around the location of the merchant.

11. The computer implemented method of claim 10 further comprising:

providing the at least one partner marketing communication to the customer;

wherein the at least one partner marketing communication comprises a partner marketing coupon.

12. The computer implemented method of claim 10 further comprising:

providing the at least one partner marketing communication to the customer over an internet channel.

13. The computer implemented method of claim 10 further comprising:

providing the at least one partner marketing communication to the customer over a wireless communications channel.

14. The computer implemented method of claim 10 further comprising:

providing the at least one partner marketing communication to the customer or to the agent at the location of the merchant;

wherein the customer activity data comprises an expected arrival time window during which the customer or the agent is expected to arrive at the location of the merchant.

15. The computer implemented method of claim 14, wherein the expected arrival time window is based on an expressed intention by the customer that the customer or the agent will arrive at the location of the merchant during the expected arrival time window.

16. The computer implemented method of claim 10, wherein selecting the at least one partner marketing communication from among the plurality of available partner marketing communications is accomplished at least in part by using a natural language processor of the processor circuit.

17. The computer implemented method of claim 10 further comprising receiving, by the processor circuit, the customer activity data through a cloud computing environment.

* * * * *

UNITED STATES PATENT AND TRADEMARK OFFICE
CERTIFICATE OF CORRECTION

Page 1 of 1

PATENT NO. : 10,354,282 B2
APPLICATION NO. : 14/742763
DATED : July 16, 2019
INVENTOR(S) : Ajay A. Deshpande et al.

It is certified that error appears in the above-identified patent and that said Letters Patent is hereby corrected as shown below:

Column 1, (72) Inventors: Line 10, should read as follows:
… Ajay A. Deshpande, White Plains, NY (US);
Kimberly D. Hendrix, New Albany, OH (US);
Herbert S. McFaddin, Yorktown Heights, NY (US);
Chandrasekhar Narayanaswami, Wilton, CT (US)

Signed and Sealed this
Third Day of September, 2019

Andrei Iancu
*Director of the United States Patent and Trademark Office*